(12) United States Patent
Park

(10) Patent No.: US 7,133,107 B2
(45) Date of Patent: Nov. 7, 2006

(54) LIQUID CRYSTAL DISPLAY DEVICE HAVING VENTING PORTIONS IN SEAL PATTERN AND METHOD OF MANUFACTURING THE SAME

(75) Inventor: Ki Bok Park, Gyeongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/603,606

(22) Filed: Jun. 26, 2003

(65) Prior Publication Data

US 2004/0070722 A1    Apr. 15, 2004

(30) Foreign Application Priority Data

Jul. 3, 2002    (KR)    ............ 10-2002-0038288

(51) Int. Cl.
*G02F 1/1339*    (2006.01)
*G02F 1/1341*    (2006.01)

(52) U.S. Cl. ............ 349/153; 349/154; 349/189; 349/190

(58) Field of Classification Search ............ 349/153, 349/154, 189, 190
See application file for complete search history.

(56) References Cited

U.S. PATENT DOCUMENTS

| | | | |
|---|---|---|---|
| 5,184,239 A * | 2/1993 | Sano et al. | 349/154 |
| 6,531,329 B1 * | 3/2003 | Asakura et al. | 438/30 |
| 6,678,029 B1 * | 1/2004 | Suzuki | 349/154 |

* cited by examiner

*Primary Examiner*—Andrew Schechter
(74) *Attorney, Agent, or Firm*—McKenna Long & Aldridge LLP

(57) ABSTRACT

A liquid crystal display device includes first and second substrates, a seal pattern disposed between outer peripheral portions of the first and second substrates, and a plurality of venting portions formed in the seal pattern at corner portions of the first and second substrates for venting air confined between the first and second substrates.

16 Claims, 5 Drawing Sheets

Before substrates attachment

During substrates attachment

After substrates attachment

Liquid crystal injection hole

Line width:0.27mm

Before substrates attachment

Liquid crystal injection hole

During substrates attachment

Liquid crystal injection hole

Line width:1.00mm

After substrates attachment

—Liquid crystal injection hole

Line width:0.27mm

—Liquid crystal injection hole

Line width:0.27mm

—Liquid crystal injection hole

Line width:0.27mm

Line width: 0.27mm

Before substrates attachment

Liquid crystal

Line width: 0.27mm

Liquid crystal dropping

Line width: 1.00mm

After substrates attachment

LIQUID CRYSTAL DISPLAY DEVICE HAVING VENTING PORTIONS IN SEAL PATTERN AND METHOD OF MANUFACTURING THE SAME

This application claims the benefit of the Korean Application No. P 2002-38288 filed on Jul. 3, 2002, which is hereby incorporated by reference.

BACKGROUND OF THE INVENTION

1. Field of the Invention

The present invention relates to a display device and a method of manufacturing a display device, and more particularly, to a liquid crystal display device and a method of manufacturing a liquid crystal display device.

2. Discussion of the Related Art

A liquid crystal display (LCD) device displays images by controlling light intensity through a liquid crystal material injected between two thin substrates. The light intensity is controlled by changing orientation of liquid crystal molecules of the liquid crystal material by inducing an electric field to the liquid crystal molecules. The electric field is created by supplying a voltage to a pixel electrode formed on one of the two thin substrates and supplying a voltage to a common electrode formed on another one of the two thin substrates. Presently, LCD devices are commonly used for electronic instruments, such electronic watches, liquid crystal TVs, and notebook computers, and in transportation devices, such automobiles and airplanes.

FIG. 1 is a cross sectional view of a liquid crystal cell according to the related art. In FIG. 1, a liquid crystal cell includes an array substrate 110 having a TFT and a pixel electrode aligned thereon, a color filter substrate 120 having a color filter and a common electrode aligned thereon, and a liquid crystal material between the array and color filter substrates 110 and 120. The liquid crystal cell is manufactured by forming an alignment layer for aligning liquid crystal molecules of the liquid crystal material layer, bonding the array and color filter substrates 110 and 120 together to maintain a uniform gap, cutting the bonded substrates into a plurality of unit cells, and injecting the liquid crystal material into the gap between the bonded substrates.

However, failure of the picture quality may occur depending on the locations on the LCD device when the cell gap is not uniform since the transmittance of the light passing through the region is varied spatially, which turns out to be a more serious problem with a large-sized liquid crystal panel. Accordingly, the cell gap formation process includes depositing a seal line 130 on the array substrate 110 before being bonded with the color filter substrate 120, which has spacers scattered thereon. Then, the liquid crystal material is injected into the cell gap and the seal line 130 is sealed.

FIGS. 2A to 2C are plan views of a seal pattern according to the related art. In FIG. 2A, when an upper substrate is not yet bonded to a lower substrate, a seal line is configured to comprise a single line of sealant with a liquid crystal injection hole.

In FIG. 2B, when the upper and lower substrates are bonded together, any air surrounded by the seal line must be vented and made to flow through the liquid crystal injection hole. Accordingly, air pressure through the liquid crystal injection hole significantly increases. Thus, any spacers scattered between the bonded substrates will be dislodged. As a result, the gap between the bonded substrates will not remain uniform. Moreover, in order to compensate for the increase of air pressure through the liquid crystal injection hole, pressure applied to the two substrates must be increased, thereby possibly damaging the substrates. In addition, the damaged substrates problem becomes more serious when the substrates are enlarged.

In FIG. 2C, when the substrates have been bonded, a width of the seal line increases and a width of the liquid crystal injection hole decreases.

SUMMARY OF THE INVENTION

Accordingly, the present invention is directed to a liquid crystal display device and a method of manufacturing a liquid crystal display device that substantially obviates one or more of the problems due to disadvantages of the related art.

An object of the present invention is to provide a liquid crystal display device having an improved seal pattern.

Another object of the present invention is to provide a method of manufacturing a liquid crystal display device having an improved seal pattern.

Additional features and advantages of the invention will be set forth in the description which follows, and in part will become apparent from the description, or may be learned from practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, a liquid crystal display device includes first and second substrates, a seal pattern disposed between outer peripheral portions of the first and second substrates, and a plurality of venting portions formed in the seal pattern at corner portions of the first and second substrates for venting air confined between the first and second substrates.

In another aspect, a method of manufacturing a liquid crystal display device includes providing first and second substrates, forming a seal pattern along an outer peripheral surface of the first substrate, the seal pattern configured such that a seal line is discontinuous at each corner of the first and second substrates, and adhering the first substrate having the seal pattern formed thereon with the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
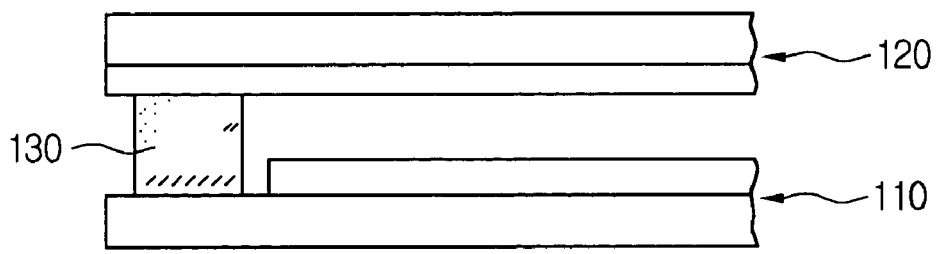
FIG. 1 is a cross sectional view of a liquid crystal cell according to the related art.
Figure 2A:
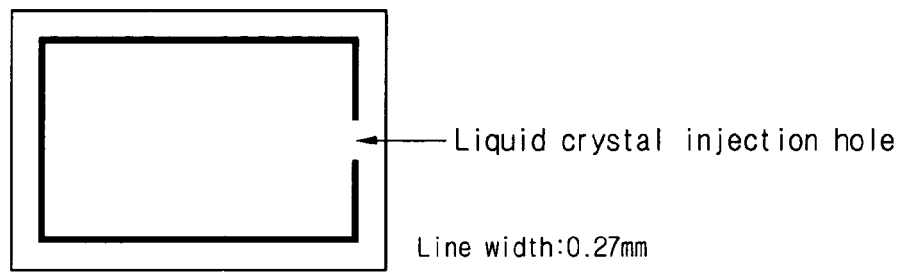
FIGS. 2A to 2C are plan views of a seal pattern according to the related art.
Figure 2B:
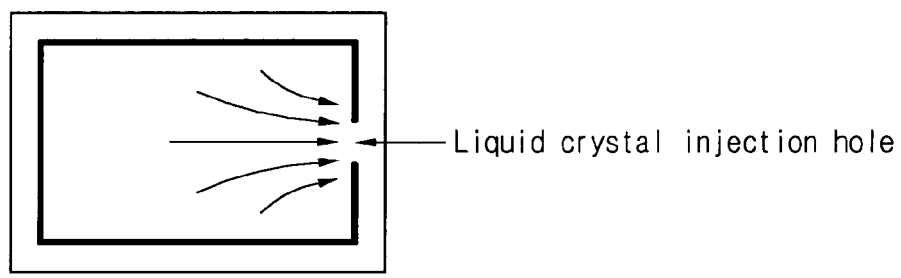
Figure 2C:
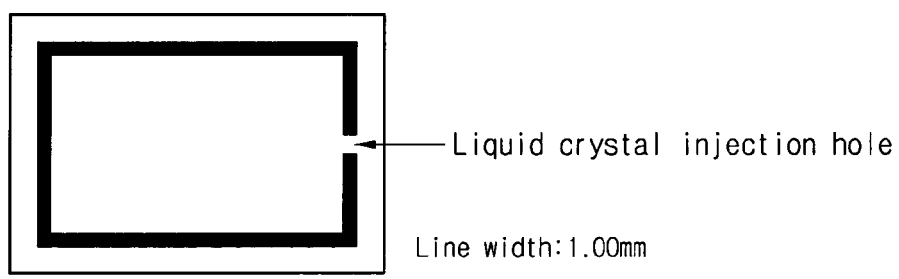
Figure 3A:
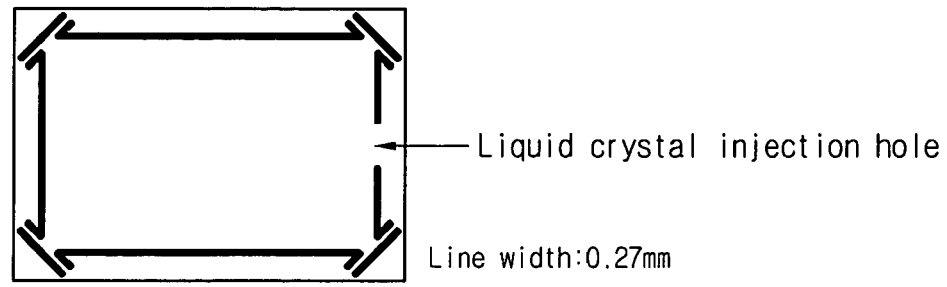
FIGS. 3A to 3C are plan views of an exemplary seal pattern according to the present invention.
Figure 3B:
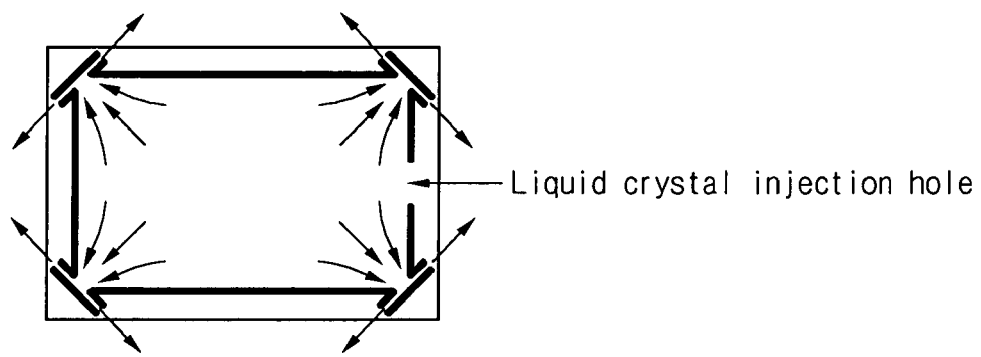
Figure 3C:
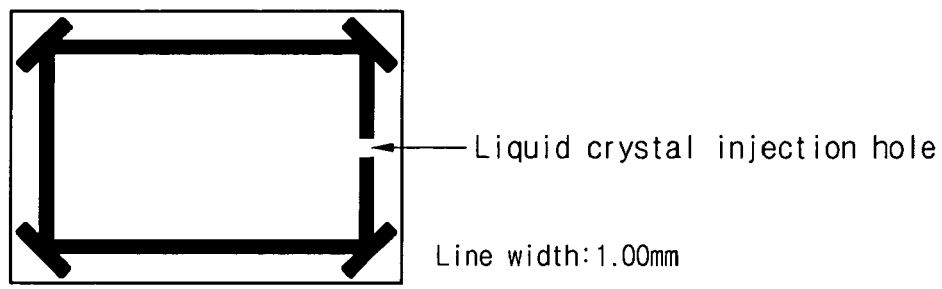

FIGS. 3A to 3C are plan views of an exemplary seal pattern according to the present invention. In FIG. 3A, a seal pattern may be formed between two substrates before attachment of the substrates. For example, the seal pattern may have a line width with a range of about 0.20 mm to about 0.40 mm, more specifically the line width of the seal pattern may be about 0.27 mm. The seal pattern includes a liquid crystal injection hole and a plurality of corner venting portions. Each of the corner venting portions includes at least two seal vents that are disposed at opposite directions and have a vent opening of about 0.5 mm. Although not shown, edge venting portions may be provide along edge portions of the seal pattern.

In FIG. 3B, during attachment of the two substrates, air confined within the seal pattern may be exhausted from an interior of the two substrates to an exterior via the corner venting portions of the seal pattern via the seal vents.

In FIG. 3C, after the substrates have been attached, the line width of the seal pattern increases to about 1.00 mm. Accordingly, the seal vents of the corner venting portions are sealed such that only the liquid crystal injection hole remains open. Thus, the vent openings at each corner venting portion may not exceed the line width of the seal pattern.

Figure 4:
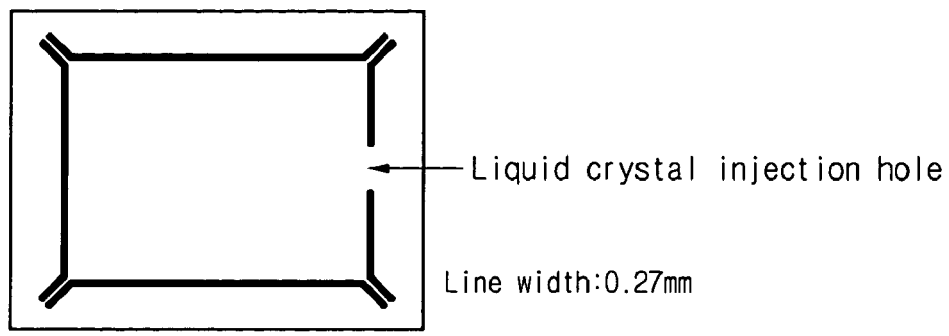
FIG. 4 is a plan view of another exemplary seal pattern according to the present invention.

FIG. 4 is a plan view of another exemplary seal pattern according to the present invention. In FIG. 4, a seal pattern is formed along a perimeter between two substrates with a liquid crystal injection hole being formed on one side between the two substrates. The seal pattern may have a line width with a range of about 0.20 mm to about 0.40 mm, more specifically the line width of the seal pattern may be about 0.27 mm, and may include a plurality of corner venting portions. Each of the corner venting portions has a single opening aligned with a corner of the two substrates. Unlike the seal vents of the corner venting portions of FIG. 3A, which are aligned in opposite directions and offset from the corner of the two substrates, all of the corner venting portions of FIG. 4 are aligned to each of the corners of the two substrates. Accordingly, during attachment of the two substrates, air confined within the seal pattern may be exhausted from an interior of the two substrates to an exterior via the corner venting portions of the seal pattern via the single seal vents. Thus, after the two substrates have been attached, the single seal vents in the corner venting portions will be sealed.

Figure 5:
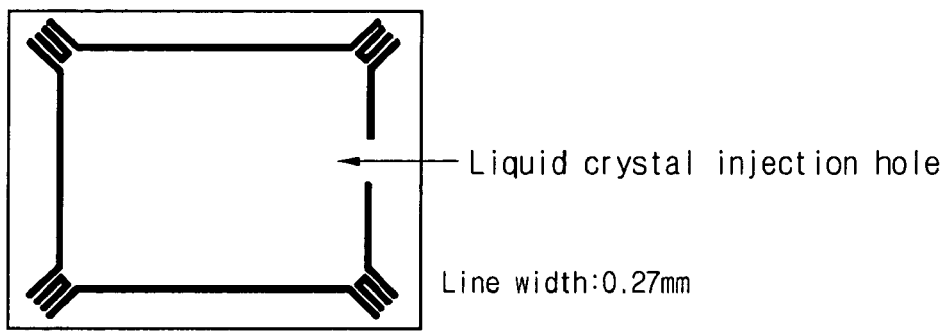
FIG. 5 is a plan view of another exemplary seal pattern according to the present invention.

FIG. 5 is a plan view of another exemplary seal pattern according to the present invention. In FIG. 5, a seal pattern is formed along a perimeter between two substrates with a liquid crystal injection hole being formed on one side between the two substrates. The seal pattern may have a line width with a range of about 0.20 mm to about 0.40 mm, more specifically the line width of the seal pattern may be about 0.27 mm, and may include a plurality of corner venting portions. Each of the corner venting portions has dual openings aligned with a corner of the two substrates. Unlike the seal vents of the corner venting portions of FIG. 3A, which are aligned in opposite directions and offset from the corner of the two substrates, all of the corner venting portions of FIG. 5 are aligned to each of the corners of the two substrates. Accordingly, during attachment of the two substrates, air confined within the seal pattern may be exhausted from an interior of the two substrates to an exterior via the corner venting portions of the seal pattern via the dual seal vents. Thus, after the two substrates have been attached, the dual seal vents in the corner venting portions will be sealed.

Figure 6:
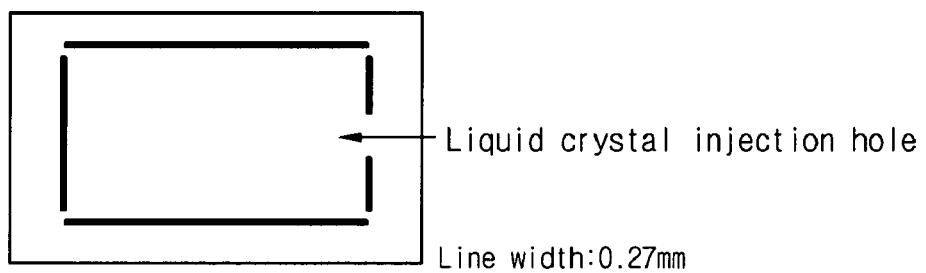
FIG. 6 is a plan view of another exemplary seal pattern according to the present invention.

FIG. 6 is a plan view of another exemplary seal pattern according to the present invention. In FIG. 6, a seal pattern is formed along a perimeter between two substrates with a liquid crystal injection hole being formed on one side between the two substrates. The seal pattern may have a line width with a range of about 0.20 mm to about 0.40 mm, more specifically the line width of the seal pattern may be about 0.27 mm, and may include a plurality of corner venting portions. Each of the corner venting portions may include openings aligned with side portions of the two substrates. Unlike the seal vents of the corner venting portions of FIGS. 3A, 4, and 5, which are aligned with the corners of the two substrates, all of the corner venting portions of FIG. 6 are aligned to sides of the two substrates. Accordingly, during attachment of the two substrates, air confined within the seal pattern may be exhausted from an interior of the two substrates to an exterior via the corner venting portions of the seal pattern via the vent openings. Thus, after the two substrates have been attached, the vent openings in the corner venting portions will be sealed.

A total amount of seal material for forming the seal pattern of FIG. 6 may be reduced, as compared to the amounts of seal material required in the seal patterns in FIGS. 3A, 4, and 5. Accordingly, in FIG. 6, the corner venting portions may have vent openings smaller than those of FIGS. 3A, 4, and 5. For example, since the vent openings of FIGS. 3A, 4, and 5 are about 0.5 mm, the vent openings in FIG. 6 may be less than 0.5 mm.

Figure 7A:
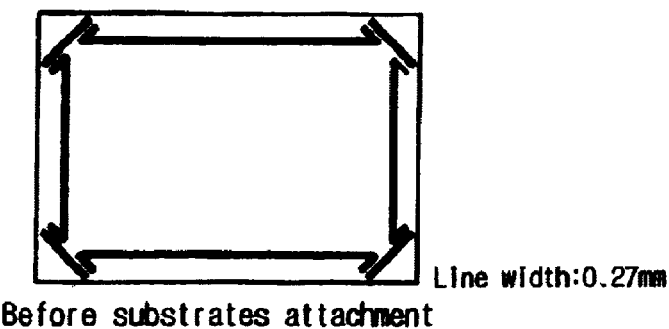
FIGS. 7A to 7C are plan views of an exemplary method for manufacturing a liquid crystal display device according to the present invention.
Figure 7B:
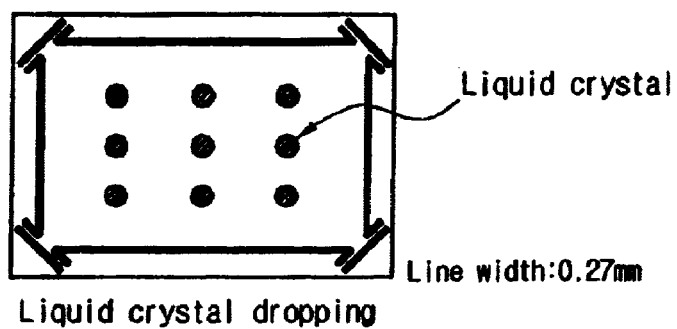
Figure 7C:
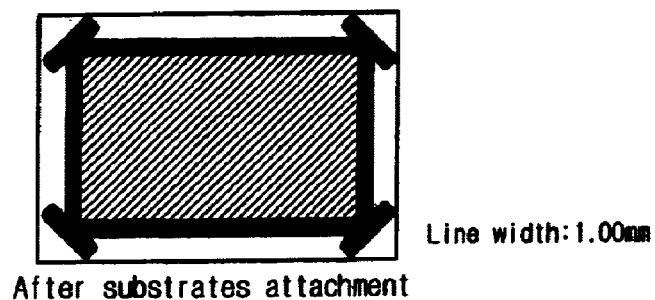

FIGS. 7A to 7C are plan views of an exemplary method for manufacturing a liquid crystal display device according to the present invention. Although, the corner venting portions of the seal pattern are shown to be similar to those shown in FIGS. 3A to 3C, any of the exemplary corner venting portions shown in FIGS. 4 and 5 may be incorporated into the device shown in FIGS. 7A to 7C. Moreover, any combination of the corner venting portions shown in FIGS. 3A, 4, and 5 may be used.

In FIG. 7A, a seal pattern may be formed between two substrates before attachment of the substrates. For example, the seal pattern may have a line width with a range of about 0.20 mm to about 0.40 mm, more specifically the line width of the seal pattern may be about 0.27 mm. The seal pattern includes a liquid crystal injection hole and a plurality of corner venting portions. Each of the corner venting portions includes at least two seal vents that are disposed at opposite directions and have a vent opening of about 0.5 mm. Although not shown, edge venting portions may be provide along edge portions of the seal pattern.

A first one of the two substrates may include a TFT array substrate and another one of the two substrates may include a color filter substrate. The TFT array substrate may include a plurality of thin film transistors and pixel electrodes, and the color filter substrate may include color filters and a common electrode. In addition, the array substrate and/or the TFT substrate may include an alignment layer for aligning liquid crystal molecules of a liquid crystal material in a specific direction. Accordingly, the seal pattern may be formed along an outer peripheral surface of the substrate that includes the alignment layer.

Prior to attaching the TFT array and color filter substrates together, the liquid crystal material is deposited on a surface of one of the TFT array and color filter substrates. Accordingly, the liquid crystal material may be deposited onto the substrate having the seal pattern. Although not shown, a plurality of spacers may be scattered onto one or both of the substrates to maintain a uniform gap between the two substrates. Then, the other substrate not having the seal pattern may aligned over the substrate having the seal pattern and liquid crystal material. Next, the two substrates may be placed such that they contact each other, and then transferred into a vacuum chamber for pressure bonding processing.

Then, when the two substrates have been bonded together inside the vacuum chamber and the corner venting portions of the seal pattern have been sealed, the vacuum chamber is brought back to ambient pressure conditions and the liquid crystal material uniformly diffuses with the gap between the two bonded substrates Next, the bonded substrates may be processed to include a cell cutting process of cutting liquid crystal cells into unit cells, a module process of attaching driver ICs and/or a back light attachment process.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display device, comprising:
   first and second substrates;
   a seal pattern disposed between outer peripheral portions of the first and second substrates; and
   a plurality of venting portions formed in the seal pattern at corner portions of the first and second substrates for venting air confined between the first and second substrates,
   wherein each of the plurality of venting portions is formed at the corner portions of the first and second substrates and each of the plurality of venting portions includes a plurality of opposing vent openings.

2. The device according to claim 1, wherein each of the plurality of opposing vent openings have an opening width of about 0.5 mm.

3. The device according to claim 1, wherein air surrounded by the seal pattern is discharged through each of the plurality of venting portions during bonding of the first and second substrates.

4. The device according to claim 1, wherein a width of the seal pattern is within a range of about 0.20 mm to about 0.40 mm.

5. A method of manufacturing a liquid crystal display device, comprising:
   providing first and second substrates;
   forming a seal pattern along an outer peripheral surface of the first substrate, the seal pattern configured such that a seal line is discontinuous at each corner of the first and second substrates to form a plurality of vent portions extending from the seal pattern, wherein each of the plurality of venting portions is formed at the corner portions of the first and second substrates and each of the plurality of venting portions includes a plurality of opposing vent openings; and
   adhering the first substrate having the seal pattern formed thereon with the second substrate.

6. The method according to claim 5, wherein an area of the seal line at each corner of the seal pattern increases during the adhering of the first and second substrates.

7. The method according to claim 5, which further comprises dropping liquid crystal material into an inner region of the seal pattern formed in the first substrate.

8. The method according to claim 5, wherein the seal pattern formed on the first substrate has at least one liquid crystal injection hole.

9. The method according to claim 8, which further comprises injecting liquid crystal material into a cell gap formed by attachment of the first and the second substrates, and sealing the liquid crystal injection hole.

10. A liquid crystal display device, comprising:
    first and second substrates;
    a seal pattern having at least one liquid crystal injection hole and disposed between outer peripheral portions of the first and second substrates; and
    a plurality of venting portions formed in the seal pattern at corner portions of the first and second substrates for venting air confined between the first and second substrates,
    wherein each of the plurality of venting portions is aligned in a direction of a corner of the first and second substrates.

11. The device according to claim 10, wherein each of the plurality of venting portions includes a plurality of opposing vent openings and each of the plurality of opposing vent openings has an opening width of about 0.5 mm.

12. The device according to claim 10, wherein air surrounded by the seal pattern is discharged through each of the plurality of venting portions during bonding of the first and second substrates.

13. The device according to claim 10, wherein a width of the seal pattern is within a range of about 0.20 mm to about 0.40 mm.

14. A method of manufacturing a liquid crystal display device, comprising:
    providing first and second substrates;
    forming a seal pattern along an outer peripheral surface of the first substrate, the seal pattern having at least one liquid crystal injection hole and configured such that a seal line is discontinuous at each corner of the first and second substrates to form a plurality of vent portions from the seal pattern, wherein each of the plurality of venting portions is aligned in a direction of a corner of the first and second substrates; and
    adhering the first substrate having the seal pattern formed thereon with the second substrate.

15. The method according to claim 14, wherein an area of the seal line at each corner of the seal pattern increases during the adhering of the first and second substrates.

16. The method according to claim 14, which further comprises injecting liquid crystal material into a cell gap formed by attachment of the first and the second substrates, and sealing the liquid crystal injection hole.

* * * * *